United States Patent [19]

Kudelski et al.

[11] Patent Number: 4,482,901
[45] Date of Patent: * Nov. 13, 1984

[54] METHOD AND SYSTEM FOR THERMALLY RECORDING INFORMATION ON A METALIZED RECORDING CARRIER

[75] Inventors: Stefan Kudelski, Le Mont-sur-Lausanne; Jean-Claude Schlup, Cheseaux-sur-Lausanne, both of Switzerland

[73] Assignee: Robert Bosch GmbH, Stuttgart, Fed. Rep. of Germany

[*] Notice: The portion of the term of this patent subsequent to Jul. 10, 2001 has been disclaimed.

[21] Appl. No.: 345,226

[22] Filed: Feb. 3, 1982

[30] Foreign Application Priority Data

Feb. 7, 1981 [DE] Fed. Rep. of Germany ....... 3104390

[51] Int. Cl.³ ............................................. G01D 15/08
[52] U.S. Cl. ..................................... 346/1.1; 346/163; 346/135.1
[58] Field of Search ...................... 346/135.1, 46, 162, 346/163, 164, 165, 157, 1.1

[56] References Cited

U.S. PATENT DOCUMENTS

| | | |
|---|---|---|
| 3,157,456 | 11/1964 | Kikuchi ................................ 346/78 |
| 3,434,878 | 3/1969 | Reis .................................. 346/135.1 |
| 3,679,818 | 7/1972 | Courtney-Pratt ............ 346/76 L X |
| 3,831,179 | 8/1974 | Brill .............................. 346/135.1 X |
| 3,936,545 | 2/1976 | Brill ...................................... 427/343 |
| 3,995,083 | 11/1976 | Reichle ......................... 346/135.1 X |
| 4,143,382 | 3/1979 | Brill ............................. 346/76 PH |
| 4,241,356 | 12/1980 | Brill .................................. 346/135.1 |
| 4,415,912 | 11/1983 | Kudelski ............................. 346/154 |

OTHER PUBLICATIONS

Hall et al.; Multi-Color Recording Medium; IBM Tech. Disc. Bulletin, vol. 24, No. 2, Jul. 1981, p. 1259.

Primary Examiner—Joseph W. Hartary
Attorney, Agent, or Firm—Frishauf, Holtz, Goodman & Woodward

[57] ABSTRACT

To permit multi-color recording on metalized recording paper, in which an electrode burns off a metal layer covering a colored pattern, and to provide for ready association of the electrode with a specific discrete removal position and particular colors appearing thereat, the colors are applied in the form of a line pattern formed of elementary groups or sets (10, 16) of color lines, the color lines being applied in repetitive identical patterns to the carrier, without intervening gaps.

9 Claims, 8 Drawing Figures

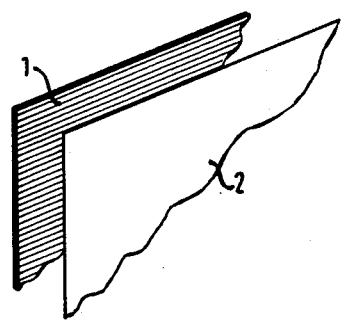
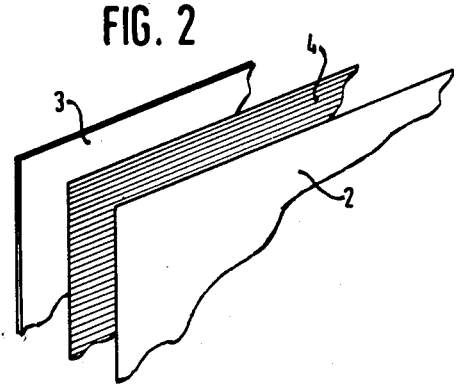
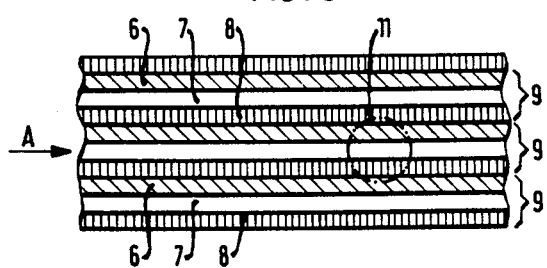
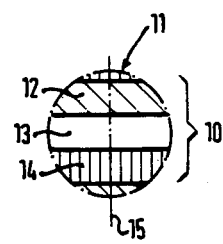

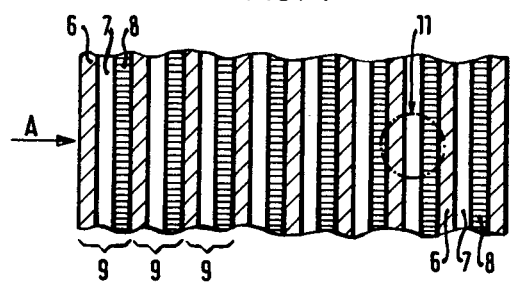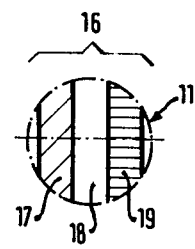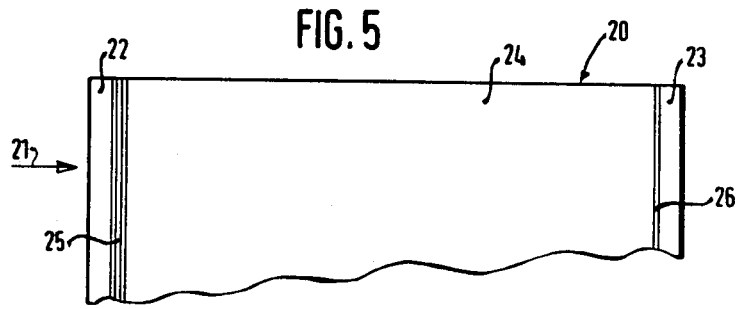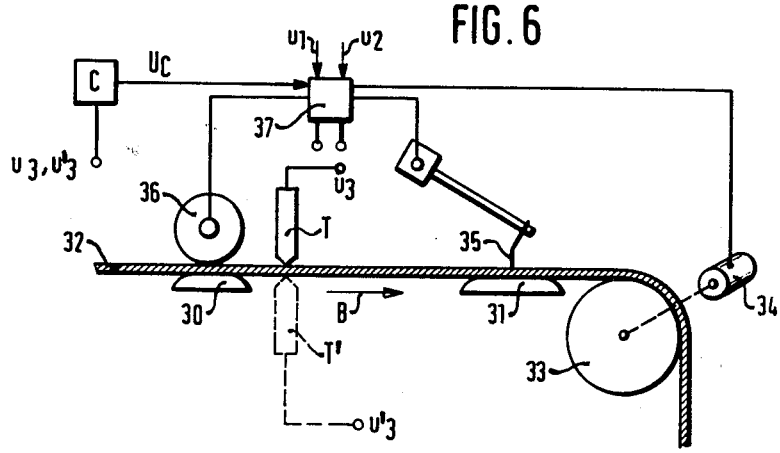

METHOD AND SYSTEM FOR THERMALLY RECORDING INFORMATION ON A METALIZED RECORDING CARRIER

Cross reference to related patents and applications, assigned to the assignee of this application, the disclosures of which are hereby incorporated by reference:

U.S. Ser. No. 222,998, filed Jan. 6, 1981, Kudelski and Schlup.
U.S. Ser. No. 223,000, filed Jan. 6, 1981, Kudelksi and Schlup now U.S. Pat. No. 4,415,915.
U.S. Ser. No. 222,999, filed Jan. 6, 1981, Jung and Mall.
U.S. Pat. No. 3,831,179, Brill et al;
U.S. Pat. No. 3,936,545, Brill et al;
U.S. Pat. No. 4,143,382, Brill et al;
U.S. Pat. No. 4,241,356, Brill et al.

The present invention relates to a method and to a system to record information on a record carrier such as a paper or plastic strip which has a metalized layer thereon, and in which the metalized layer is selectively burned off upon application of an electrical voltage to an electrode riding on the record carrier.

BACKGROUND

Various ways of recording are known; one of them utilizes an electrode which, when energized, burns off a metalized layer or coating applied to a substrate, for example a ribbon or web or tape of paper, a polyester such as "MYLAR" ®, or the like. Upon energization of the electrode, in accordance with an electrical pulse generator, the electrode covering the electrosensitive coating will burn off a pattern of dots; the surface of the substrate, which may have a contrasting or colored lacquer or other inking material applied thereto will thus be exposed, and a recording image can be obtained which is representative of the pulse pattern applied to the electrode. The web or strip of substrate is transported beneath the electrodes, preferably at a uniform speed.

Substrates which have been used and which are suitable may also be in the form of individual sheets, rather than of tapes or ribbons. The electrosensitive coating may be made of zinc, aluminum, or a zinc-cadmium compound, and is applied to the substrate, typically by vapor deposition. The pattern which is burned off will correspond to the application of signal pulses to the electrodes, with respect to time, as the web passes thereunder; the electrodes, typically, are formed as comb, of closely adjacent electrode elements which can be individually energized, arranged in a line across the web and transversely to the direction of movement thereof. The electrodes can be energized either by pulses or by a modulated voltage. To increase the contrast, and to improve the resistance to corrosion of the recording material, it has been proposed to apply a layer of ink or lacquer, for example black, beneath the electrosensitive coating. The recorded information can thus be easily read visually, and contrast is improved.

The system is suitable both for reflective reading, that is, for use with an opaque substrate; it is equally possible to use a substrate which is transparent, or to use a substrate which is made of a material which permits reproduction, for example in blueprint apparatus, or the like. For such use, a transparent lacquer is used rather than a contrasting ink layer, and the substrate itself can be suitably inked or colored, and made transparent, for example of a transparent plastic which, further, may be dyed with a suitable color.

The processes and apparatus for reproduction of this type permit good contrasting use in black-white with intermediate grey tones, in which the brightness is controlled by suitable control of the subdivision of a scanning pattern, or of scanning dots, and in which the size of the burn-out dots forming a raster or scanning pattern can be controlled to, for example, control the size of the dots or spots being burned out, so as to obtain more or less, respectively, darkness or brightness content within a grey scale.

The referenced applications by the inventors hereof and the referenced application Ser. No. 222,999, Jung et al., disclose systems and methods also suitable for multi-color recording using an electrosensitive recording process or system.

THE INVENTION

It is an object to provide an improved method and apparatus for multi-color recording utilizing the reliable and simple electrosensitive recording method and system which is easily adjusted and which readily permits reproduction of colors which are derived as compounds of base color information.

Briefly, the carrier has lines applied thereon of respectively different colors, so that color lines in form of a line pattern are printed thereon; the line pattern of adjacent color lines repeats beneath any one discrete removal position, and elementary group of color lines which includes all the colors of the color lines is placed; the electrode is then positioned at the removal position over one of the selected colors, or a multiplicity of colors, and the metal layer applied over the color strips is removed at the selected color position. The position of the electrode is determined by marker lines, likewise applied on the carrier. Thus, either one or several of the color components formed by the color strips will be exposed.

The extent of the discharge from the electrode is controlled, for example by controlling the energy of the discharge, so that the size of the discharge spot from the electrode will cover at least approximately the width of one of the color lines, but may, in accordance with control, cover more than the width of one line, or an overlap, so as to expose more than one color and thus provide a mixed color output which will have a color appearance different from that of any one of the base colors.

The system and apparatus has the advantage that colored information contents, and particularly multi-colored images or pictures, can readily be reproduced by use of the well known and reliable electrosensitive recording method. The respective color elements to be reproduced are formed at any one possible discrete removal position by at least portions of the colored lines extending over the area of the removal position.

Addressing the desired color lines or color elements of the multi-colored line pattern at the respective removal positions is facilitated when a substrate carrier is used in which the line pattern of the colors repeats periodically, so that the respective placement of any one colored line with respect to another colored line will always be the same.

For single-color reproduction of information content, a selected color strip or color line is matched to the reproduction position, for example by associating at the commencement of any one writing line of the recording or reproducing pattern, respectively, the respectively selected color line to the electrode, or to the positioning of the electrode with respect to any one of the lines which will form the marker line.

For multi-color recording, particularly for reproduction of colored images, it is desirable to derive not only information or scanning signals but, additionally, also phasing signals which synchronize the recording impulses with respect to the position of the particular color element within the discrete removal position, that is, to associate the particular color line of the group or set of color lines, as selected, with respect to the removal position. This reproduction of mixed colors is somewhat similar to the reproduction of mixed color in color television sets, or in multi-color printing, by using an additive or subtractive color mixing system in order to obtain the desired visual color effect.

Mixed or composite colors can be provided by so arranging the adjacent colored lines that at least two base colors are always contained in elementary groups or sets of the color lines. The contrast of the image can be increased if the complementary color of at least two base colors are also contained, so that, to render the base color visible, two color elements or color lines must be exposed at any one discrete removal position.

The recording carrier can be so made that the line pattern extends in parallel to the direction of the recording lines of the electrode. In this case, the respective color elements formed by portions of the lines are located next to each other, transverse to the direction of the writing. In multi-color recording, the writing electrode is deflected by phasing signals transversely to the direction of writing to such an extent that the writing electrode will be placed over the specifically selected color element of the corresponding group of color lines.

The line pattern can be generated or applied by suitable inking of a base body, or by application of a lacquer coating on the base body; multi-color offset printing is particularly suitable.

The respective lines or color elements of the color pattern can fit exactly against each other, thus eliminating gaps between the color elements and resulting in excellent reproduction. The width of the lines of the pattern can be matched to the cross-sectional shape of the recording electrode and the width and amplitude of the recording pulses, so that the diameter of the respective burn-off or removal points or dots corresponds at least approximately to the width of the printed color line. The diameter of the respective burn-off spots is selected, preferably, to be somewhat less than the resolution of which the human eye is capable; for example, at a normal viewing distance of about 30 cm, the width of the lines and the dot size should, preferably, not be greater than about 0.15 mm in diameter, and preferably somewhat less.

Exact positioning of the writing head with respect to the recording carrier is obtained by utilizing a recording carrier which has reference markers thereon. These reference markers can be scanned by sensors secured to the writing head and operating synchronously therewith, and electrically evaluated. The reference markers can be used for correction of the position of the recording head and to compensate for changes in the surface characteristics of the recordig carrier, for example due to ambient humidity, increased moisture thereof, or the like, and consequent relative shifting of the multi-color line pattern with respect to a comb-type writing electrode which will retain its dimensional stability. The markings can also be used for synchronization of the writing electrode and for the scanning head in a recording apparatus, to trigger count pulses, to permit read-out or control from a memory, as well as to control a positioning apparatus.

The reference markers can be associated with specific colors in order to facilitate initial selection upon beginning of a recording pass. The reference markers can be formed by laterally printing the markers, extending over and beyond the electrosensitive coating, so that they can be optically inspected, or scanned.

In accordance with a particularly desirable embodiment, the markers are formed as reference points and are located within the recording field with exact position with respect to the multi-color line pattern. Any positioning errors which may be due to change in the dimension of the recording medium—for example under influence of ambient moisture—will thus result in positioning errors of the recording electrode which will be so small that they can be neglected.

DRAWINGS

FIG. 1 is a schematic perspective exploded view of a recording carrier with a transparent substrate;

FIG. 2 is a schematic exploded view of a recording carrier with an opaque substrate;

FIG. 3 is a greatly enlarged top view of a line raster applied to a substrate;

FIG. 3a is an enlarged representation of the line raster within the circle 11 of FIG. 3;

FIG. 4 is an enlarged top view of the line raster in accordance with another embodiment of the invention;

FIG. 4a is a still greater enlarged view of the portion within the circle 11 of FIG. 4;

FIG. 5 is a top view of a recording carrier with markers extending perpendicularly to the line direction; and FIG. 6 is a schematic illustration of an apparatus for recording multi-color images in accordance with the method, and using the recording carriers of this invention.

The recording carrier, see FIG. 1 or 2, has a metal layer 2 which is vapor-deposited, in vacuum, on a recording substrate or carrier 1. In FIG. 1, the substrate or recording carrier 1 is a transparent plastic film which, in accordance with the desired line pattern, is dyed-through to have the polychrome light pattern therein. This recording carrier is particularly suitable for use in apparatus in which the recording is to be observed in projected form, that is, in which a light source is placed at the side of the substrate 1 which is remote from the side adjacent the viewer.

The recording carrier of FIG. 2 has a substrate 3 which is made of any suitable electrically insulating material, for example paper, but which may be a plastic film, and on which an opaque layer or lacquer coating 4 is applied. The lacquer coating 4 may also be an ink coating, printed on the substrate 3 and forming a line pattern. The metal film 2 covers the lacquer coating or printing pattern 4 at the top side thereof. The recording structure of FIG. 2 is particularly suitable for direct viewing under reflected light.

The line pattern on either one of the recording carriers of FIG. 1 or FIG. 2 can be applied either in the form as shown in FIG. 3 or in FIG. 4. In both arrangements, the line pattern is formed by adjacent parallel multi-color lines 6, 7, 8, in which the respective colors repeat in uniform sequence periodically, and which extend over the entire recording field. The lines 6, 7, 8 fit laterally against each other, without a gap, and have a width of about 0.15 mm. The recording tip of the writing electrode as well as the electrical writing pulses are so matched to the width of the colored lines of the line patterns that the diameter of the respective burn-out dots or spots correspond approximately to the width of the respective colored lines of the line patterns. This permits generation of colored images of high contrast, in which the actual color dot pattern which is generated cannot be resolved by the human eye at normal viewing distance.

The line pattern is formed of periodically sequentially repeating red, yellow and green color lines. For better illustration, the red color lines 6 are hatched with an inclined hatching, the yellow color lines 7 are left white, and the green color lines 8 are vertically hatched—see FIG. 3, or horizontally hatched—see FIG. 4, to distinguish from the direction of movement of the carrier with respect to a writing electrode. This direction of movement is indicated by arrow A. The three-color raster is not a necessary arrangement; other color combinations such as red, blue, black, and yellow or green, respectively, may be used. In some instances it is desirable to use the complementary colors of at least two base colors in the line raster, for example red/green and blue/yellow.

The arrangement of the color lines with respect to the direction of recording lines can be selected as desired. In the embodiment of FIG. 3, the lines are parallel to the recording lines of the recording electrode, as shown by the arrow A. Since the lines repeat, in sequence, adjacent each other and form among each other similar sets or groups of color lines 9, the sets or groups of color lines 9 will, also, extend parallel to the recording direction. The sets or groups 9 of the color lines form a continuous sequence of immediately adjacent elementary groups of colors, merging into each other without intervening gaps. These groups of colors are all present beneath one discrete removal position 11, shown in greatly enlarged form in FIG. 3a, and include closely matching adjacent elementary color groups 10. Each elementary color group 10 has three color elements 12, 13, 14—FIG. 3a—which are adjacent each other, and positioned along a theoretical axis 15 next to each other. The axis 15 extends perpendicularly to the direction of recording, see arrow A. Each one of the color elements 12, 13, 14 is formed by a longitudinal portion of the respective color lines 6, 7, 8.

OPERATION—Recording

For a single color recording, the recording pattern, that is, the burn-out pattern, is adjusted with respect to the line pattern printed on the recording carrier in relation to the position of the desired color element for the recording, that is, with respect to the desired color line which extends in the direction of the recording line, and in which the respective repeating color lines are arranged along the axis 15 transverse to the recording direction A.

For multi-color recording, particularly for the reproduction of colored images, phasing signals are derived from information or scanning signals, respectively, of the recording apparatus which, over suitable adjustment elements, move the recording electrode transversely to the direction of the recording (see arrow A) to such an extent that the recording electrode will fit over the respective color lines 6, 7, 8 forming the respective color element 12, 13, 14, to expose the respective color element. The region generally indicated by the circle 11 is the region within which the color electrode can be deflected from a theoretical center to provide for removal of the respective color. The circle 11 shown in FIGS. 3 and 3a illustrates the region of metal within which removal may occur, but not the size of the electrode. The actual removal position need not be in form of a circle 11, but may have a different shape. By relatively adjusting the position of the burn-off point of the electrode with respect to the respective color line or track 6, 7, 8, the respective color element 12, 13, 14 will be exposed.

FIG. 4 illustrates an embodiment in which the line pattern formed by the color lines 6, 7, 8 extends transversely to the direction of writing, as indicated by arrow A, so that color lines sets or groups 9 will appear sequentially, one after the other, under the writing electrode. The groups or sets 9 of color lines again repeat sequentially to form elementary color groups 16—see FIG. 4a—in which the respective color elements 17, 18, 19 follow each other, sequentially, in the direction of recording A. In this case, for multi-color reproduction, the phasing signals of the writing electrodes deflect in the direction of writing, that is, they increase or decrease a forward-backward stroke of the color electrode—with respect to the movement of the web or strip of the recording medium—unless it is desired to expose a color element such as the yellow element 18, which is centrally positioned.

The line rasters of either one of the embodiments of FIG. 3 or 4 may, additionally to normal pigmentation, include a magnetizable powder which is premagnetized, for example, before recording on the recording carrier. The magnetization of the lines, then, in addition to the color element, permits providing reference points for an inductive signal transducer secured to the recording apparatus, for example secured to the recording head, in order to provide signals for precise positioning of the electrodes with respect to the individual lines of the line groups 9 and, if desirable, also for synchronization of triggering of recording pulses. Since these reference points are positioned directly within the recording field, positioning errors of the writing electrodes with respect to the line patterns are particularly low even though the recording medium may shrink or expand under varying conditions of ambient humidity or moisture of the recording carrier.

Reference signals can be applied not only magnetically, but also optically, and for such transmission, the raster lines which form reference may be applied to have, for example, a different degree of reflectivity than other raster lines, such that they can be scanned by an optical scanning device, even after metalization, and recognized upon illumination by a light sensitive sensor.

A recording carrier 20 is shown in FIG. 5 in which two edge zones 22, 23, extending transversely to the writing direction indicated by arrow 21, have marker lines 25, 26 just beyond the metalized region 24 of the recording carrier; the metalization may also extend over the lines 25, 26 if they are visible for scanning through the metalization, or if they are applied in the form of magnetic tracks for inductive pick-up. The respective distances of the marking lines 25 correspond to the distance which the elements of a color in a line of the line pattern of FIG. 4 have with respect to each other. To facilitate the color selection at the beginning of recording, the lines may additionally form reference markers for an initial setting. The marking lines 26 at the far end of the metalized region 24 can be used, for example, to sense deviation of the flat size of the recording medium with respect to a reference or standard dimension, for example expansion or shrinkage under different conditions of humidity. If the marker lines are outside of the metalized region 24, they can easily be scanned optically.

Marker lines 25, 26 can be applied, further, additionally to the reference lines as shown and located within the recording field 24. It is also possible to apply reference markers at the side of the carrier opposite that on which the metalized coating 2 is applied; this is particularly suitable if the carrier is opaque, or is designed for reflective viewing (FIG. 2).

A system to carry out the method is shown in FIG. 6. Two fixed supports 30, 31 are provided over which a flexible recording carrier 32, which may correspond to the carriers of FIG. 1 or 2, and which has applied thereto the strip pattern of either FIG. 3 or 4, is transported by a transport device 33, 34. Movement is in direction of the arrow B. Transport device 33, 34 is shown only schematically. The electrosensitive coating 2 of the carrier 32 is engaged in the region of the support 31 by a recording electrode 35. It is further engaged in the region of the support 30 by a wide-area counter electrode 36 formed, for example, as a conductive roller riding on the paper and in engagement therewith. The electrodes 35, 36 are connected to a pulse source 37 which is controlled in accordance with writing signals U1, and phase or color position signals U2. The pulse generator 37 also provides a control signals to the transport device 33, 34 to longitudinally move the recording carrier in the direction of the arrow B. The writing signals U1 provide signals to energize the respective electrode 35 of an assembly or comb electrode structure to provide a burn-out pulse at a selected instant of time. The phase or color signals U2 are used to so position the respective writing electrode element 35 that, when the appropriate burn-out pulse is received, its position over the recording carrier 32 will be such that the burn-out pulse will make visible the desired specific color element of the color element group or set beneath the recording stylus. The phase signals U2 thus have the function to position the writing electrode element 35 at any one burn-out pulse relatively with respect to the carrier 32 such that the selected color element will be made visible at the burn-out position.

The side markers 25, 26 can be read by suitable transducers. FIG. 6 shows a transducer T positioned above the recording carrier and providing an output signal U3. A similar transducer T' can be placed beneath the recording carrier to, likewise, read markers if, for example, the substrate is transparent, or by reflected light if it is opaque. In some cases, only a single transducer may be needed. Transducer T' provides an output signal U'3. These output signals are applied to a control unit C providing a control output signal UC to adjust the phasing of the signal U2 in case the width of the markers, as sensed by the transducers T, T', deviates from a standard, for example by introducing a slight delay therein. Such a slight delay can be introduced by connecting the signal U'3 through a variable—capacity capacitor, such as a solid-state capacitor of the varactor type, a delay line, or the like. Any suitable delay circuit may be used. The exact positioning of the writing head, or an electrode element thereof, with respect to the carrier substrate, thus can be obtained by using the side markers.

Rather than using separate transducers T, T', the transducers or other arrangements to pick up the markings can also be placed on the recording head. Recording heads with only a single electrode, which moves transversely of the paper, can also be used. The markers, thus, can be suitably sensed and evaluated to correct the precise position of the writing head or, rather, the writing electrode thereof, with respect to the substrate to compensate for any possible changes in area due to moisture or humidity, which might cause relative shifting of the multi-color strips or lines with respect to the recording signals U1, U2 being supplied to the recording electrode.

For recording of multi-color images, it may be necessary to expose single but differently colored elements in adjacent groups or, for composite colors, one or two elements of any specific group in addition to one selected color element. Thus, a multicolor effect is obtained by which various tones and hues as well as colors can be rendered visible, similarly to color television reproduction, by burning off the metalizing layer over the specific color element which was selected, in accordance with the information to be recorded.

Various changes and modifications may be made, and features described in connection with any one of the embodiments may be used with the others, within the scope of the inventive concept.

Rather than physically moving the electrode with respect to the carrier, it is also possible to provide an electrode array or comb electrode in which the electrodes are staggered and small enough to fit over the respective lines or strips 6, 7, 8 of the sets 9 of the color pattern, and the signal U2, which forms the color signal, then is in form of a steering signal for the burn-out pulse U1 applied to the pulse generator 37 to control application of the pulse to the respective electrode element. The electrode 35, shown as a single electrode element, can be in form of a traveling head traveling transversely to the direction of arrow B—FIG. 6—or in form of a comb array of adjacently placed electrode contacts, for example longitudinally staggered and fitting over the respective color lines of the sets 9. The invention is not limited to any specific type of electrode arrangement, the actual structure of which can be as described in the referenced patents and applications.

We claim:

1. Method of recording color images on an electrosensitive recording carrier, under control of electrical recording signals ($U_1$, $U_2$) representative of position and color of the images on the carrier, in which the carrier includes an elongated insulated substrate (1, 3, 32);
at least one reference marker located on the substrate;
a plurality of color elements positioned with respect to each other in a predetermined sequence or pattern, located on the substrate;
and a metallized layer (2) above the color elements, comprising the steps of
electrically contacting the metallized layer (2) with a writing or recording electrode (35);
sensing the position of the reference marker;
energizing the writing or recording electrode (35) when said writing or recording electrode is above at least one selected color element and burning off a selected portion of the metallized layer (2) by the writing or recording electrode under control of recording pulses applied to said electrode to expose a respectively selected color element;

and controlling the recording pulses to burn off selected portions of the metallized layer about a selected color element when the writing or recording electrode is spaced from the reference marker by a predetermined distance to insure coordination of the recording signals with the position of the respective selected color element, wherein, in accordance with the invention, the reference marker comprises a reference line (25, 26) orginally applied on the substrate, and extending longitudinally thereof;

and the color elements (9) are applied on the substrate in the form of repetitively recurring identical sets or groups of at least three adjacent differently colored color lines (6, 7, 8; 12, 13, 14), the electrode being located above a selected line or lines at a plurality of removal positions (11), the recording pulses burning off selected portions of the metallized layer above a selected color line or lines at selected removal positions to remove the metallized layer at said selected removal position, selectively, above a selected respective color line, or a selected plurality of differently colored lines.

2. Method according to claim 1, wherein the step of energizing the electrode to remove the metal layer comprises selectively matching the energy of the discharge from the electrode to, at least approximately, burn off metal of the metal layer (2) only over a selected one color line, or over more than one adjacent color lines.

3. Method according to claim 1, including the step of adjusting the position of the electrode with respect to a particular line of the set of color lines upon commencing of recording to provide single-color reproduction of information content in accordance with the electrical signals (U1).

4. Method according to claim 1, wherein the electrical signals include recording signals (U1) and phasing signals (U2), the phasing signals controlling the relative position of the electrode, upon energization, with respect to a selected one of the color lines at a discrete removal position.

5. Method according to claim 4, further including the step of scanning reference marker lines (25, 26) applied to the carrier (1, 3; 32), and synchronizing the application of the electrical signals (U1, U2) with respect to the scanning signals to positively associate the relative position of the electrode (35) with respect to a selected one of the selected colors at the discrete removal position.

6. Color recording apparatus in combination with a recording carrier, said carrier comprising
an elongated insulating substrate (1, 3);
a metallized layer (2) thereon;
and a multi-color pattern of colored elements (9) located in sets or groups beneath the metallized layer (2), said colored elements comprising multiple colors for selective exposure upon burning-off of the metallized layer thereover to provide an image representative of a selected color or a multi-color image representation, said apparatus comprising
a recording electrode (35) in engagement with the metallized layer(2) on the substrate (1, 3);
means (37) to provide energizing pulses to said electrode (35) to burn off a selected portion of the metallized layer above selected colored elements;
sensing means (T, T') sensing a predetermined reference marker on said recording carrier;
and control means (C) controlling the phasing of application of a color recording signal ($U_1$, $U_2$) to the electrode to expose at least one predetermined color element, in accordance with the position of the electrode on the recording carrier with reference to said marker element, wherein, in accordance with the invention,
the marker element comprises a reference marker line originally applied on the carrier, and extending longitudinally thereof;

and the color elements comprise elementary groups or sets of at least three colored lines, applied to the carrier in the form of identical, sequentially repetitive groups or sets of colored lines, the electrode removing selected portions of the metallized layer (2) at selected removal positions (11) to exposed the underlying substrate and to form an image of an information content to be recorded by contrast between the metal layer and the then exposed colored line or lines positioned beneath any discrete removal position.

7. The combination according to claim 6, wherein the apparatus includes means (33, 34) for relatively moving the record carrier (1, 3, 32) and the electrode;
and wherein (FIG. 3) the line pattern of the elementary groups or sets (10, 16) extends parallel to the direction (A, B) of said relative movement.

8. The combination according to claim 6, wherein the apparatus includes means (33, 34) for relatively moving the record carrier (1, 3, 32) and the electrode;
wherein (FIG. 3) the line pattern of the elementary groups or sets (10, 16) extends parallel to the direction (A, B) of said relative movement;
and wherein the line pattern of the elementary groups or sets (10, 16) extends transversely to the direction (A, B) of said relative movement.

9. The combination according to claim 6, wherein said elementary groups or sets are applied to the carrier immediately adjacent each other without gaps between the respectively differently colored lines (6, 7, 8) and the lines of adjacently positioned sets (10, 16).

* * * * *